United States Patent
Fenwick

(10) Patent No.: US 8,672,289 B2
(45) Date of Patent: Mar. 18, 2014

(54) DOMESTIC WATER TAP OR FAUCET WITH FLOATING BUOYANT BALL VALVE AND ACTIVATION ROD

(75) Inventor: Henry Teasdale Fenwick, South Perth (AU)

(73) Assignee: Pride Technologies International Pty Ltd, East Perth (AU)

( * ) Notice: Subject to any disclaimer, the term of this patent is extended or adjusted under 35 U.S.C. 154(b) by 0 days.

(21) Appl. No.: 13/265,210

(22) PCT Filed: Aug. 28, 2009

(86) PCT No.: PCT/AU2009/001106
§ 371 (c)(1),
(2), (4) Date: Dec. 22, 2011

(87) PCT Pub. No.: WO2010/121286
PCT Pub. Date: Oct. 28, 2010

(65) Prior Publication Data
US 2012/0090715 A1      Apr. 19, 2012

(30) Foreign Application Priority Data
Apr. 21, 2009   (AU) .................................. 2009201565

(51) Int. Cl.
*F16K 31/44* (2006.01)
(52) U.S. Cl.
USPC .............................. 251/82; 251/339; 137/410

(58) Field of Classification Search
USPC ........ 251/129.14, 264, 82, 339; 137/801, 410
See application file for complete search history.

(56) References Cited

U.S. PATENT DOCUMENTS

| | | | | |
|---|---|---|---|---|
| 602,598 | A | * | 4/1898 | Field .............................. 251/320 |
| 3,273,589 | A | * | 9/1966 | Dollison et al. ............... 137/495 |
| 3,586,288 | A | | 6/1971 | Gulich |
| 4,181,987 | A | * | 1/1980 | Kesselman ........................ 4/678 |
| 4,273,310 | A | | 6/1981 | Ginzler |
| 4,562,865 | A | | 1/1986 | Lemkin et al. |
| 4,667,349 | A | | 5/1987 | Son |
| 5,037,062 | A | | 8/1991 | Neuhaus |
| 5,076,499 | A | * | 12/1991 | Cranford .................... 239/585.2 |
| 6,006,784 | A | | 12/1999 | Tsutsui et al. |

FOREIGN PATENT DOCUMENTS

| | | |
|---|---|---|
| CN | 2382906 Y | 6/2000 |
| GB | 191402678 A | 0/1915 |
| GB | 2269000 A | 1/1994 |

OTHER PUBLICATIONS

International Search Report for PCT/AU2009/001106 Sep. 23, 2009.

* cited by examiner

*Primary Examiner* — Eric Keasel
(74) *Attorney, Agent, or Firm* — Cascio & Zervas

(57) ABSTRACT

A water tap is shown, employing a spherical sealing member which is urged into a sealing position by water pressure. The sealing member may be displaced centrally into the water flow in order to permit flow of water around the sealing member and through the tap.

28 Claims, 2 Drawing Sheets

DOMESTIC WATER TAP OR FAUCET WITH FLOATING BUOYANT BALL VALVE AND ACTIVATION ROD

FIELD OF THE INVENTION

The present invention relates to a domestic water tap It is particularly envisaged for use as a garden water tap, or a tap mounted on an exterior wall of a building. It will be understood that used in this specification the term 'tap' takes on its British meaning, being equivalent to the American term 'faucet'.

BACKGROUND TO THE INVENTION

Many domestic garden water taps employ a compression-type valve, whereby the turning of a tap handle forces a disc washer or jumper valve onto a valve seat, thus preventing the flow of water through the valve seat. Such valves are mechanically simple, cheap, and reliable.

As the valve ages, the washer and the valve seat both deteriorate. This can cause leakage of water though a closed tap. In order to prevent this, where the deterioration is minor, the valve can generally be closed by additional tightening of the handle.

Such tightening can be difficult for those without sufficient strength, such as the aged or infirm. In order to overcome this problem, there are several mechanical devices available to assist the aged or infirm in the opening and closing of tap valves. Often, however, the use of these devices can be both cumbersome and inconvenient.

Additionally, the deterioration requires relatively frequent replacement of worn washers. When washers are not replaced, wastage of water due to tap leakage can be significant.

It is desirable to provide a garden tap which can be readily operated by the aged or infirm without the need for additional mechanical assistance. Such a tap should readily close, without a propensity for leakage. It should also be arranged such that the degree of opening can be easily adjusted, in order to vary the flow rate of water passing through the tap.

The present invention seeks to meet these desiderata.

SUMMARY OF THE INVENTION

In accordance with the present invention there is provided a water tap for use in regulating the flow of water delivered under pressure, the tap including a valve seat, a sealing member, and an activating rod, whereby the tap is movable between a closed position in which the water pressure urges the sealing member into engagement with the valve seat, thus preventing the flow of water through the tap, and an open position in which the activating rod urges the sealing member away from the valve seat, thus allowing flow of water through the tap, characterised in that the sealing member has a density less than water, and in that the activating rod is arranged to act through a centroid of the sealing member and to urge the sealing member into a position substantially centrally of the resulting water flow. Advantageously, this arrangement permits the sealing member to maintain a position centrally of the water flow due to an application of Bernoulli's principle. As a result, the degree of displacement of the sealing member from the valve seat can be readily controlled, thus allowing for easy adjustment of the rate of water flow.

It is preferred that the sealing member be spherical. This means that the orientation of the sealing member can vary without affecting its ability to readily seal.

In a preferred embodiment, the activating rod is connected to a handle, mounted in a threaded arrangement at an outer end of the tap, whereby rotation of the handle causes axial movement of the activating rod. This allows for easy adjustment of the action of the rod against the sealing member.

The sealing member may, be located within a receiving compartment of the tap, the receiving compartment having a water inlet axially opposed to the valve seat, the water inlet being sized so as to prevent the passage of the sealing member in the event of a loss of water pressure.

Searching on behalf of the applicant has revealed previous valve designs using fluid pressure to hold a sealing ball in position. These include U.S. Pat. Nos. 4,273,310, 4,667,349, 4,562,865 and 5,037,062. All of these arrangements act to displace a spherical member laterally of a valve seat, rather than into the fluid flow as in the present invention. As such, they are all 'on/off' valves, without the ready ability to control the flow of fluid through the valve through the use of Bernoulli's principle.

U.S. Pat. No. 6,006,784 does disclose a spherical sealing member which is displaced into the fluid flow. Nonetheless, the arrangement described in this patent is also an 'on/off' valve, with no application of Bernoulli's principle to allow for adjustment of fluid flow.

BRIEF DESCRIPTION OF THE DRAWINGS

It will be convenient to further describe the invention with reference to preferred embodiments of the water tap of the present invention. Other embodiments are possible, and consequently, the particularity of the following discussion is not to be understood as superseding the generality of the preceding description of the invention. In the drawings.

DESCRIPTION OF PREFERRED EMBODIMENT

Figure 1:
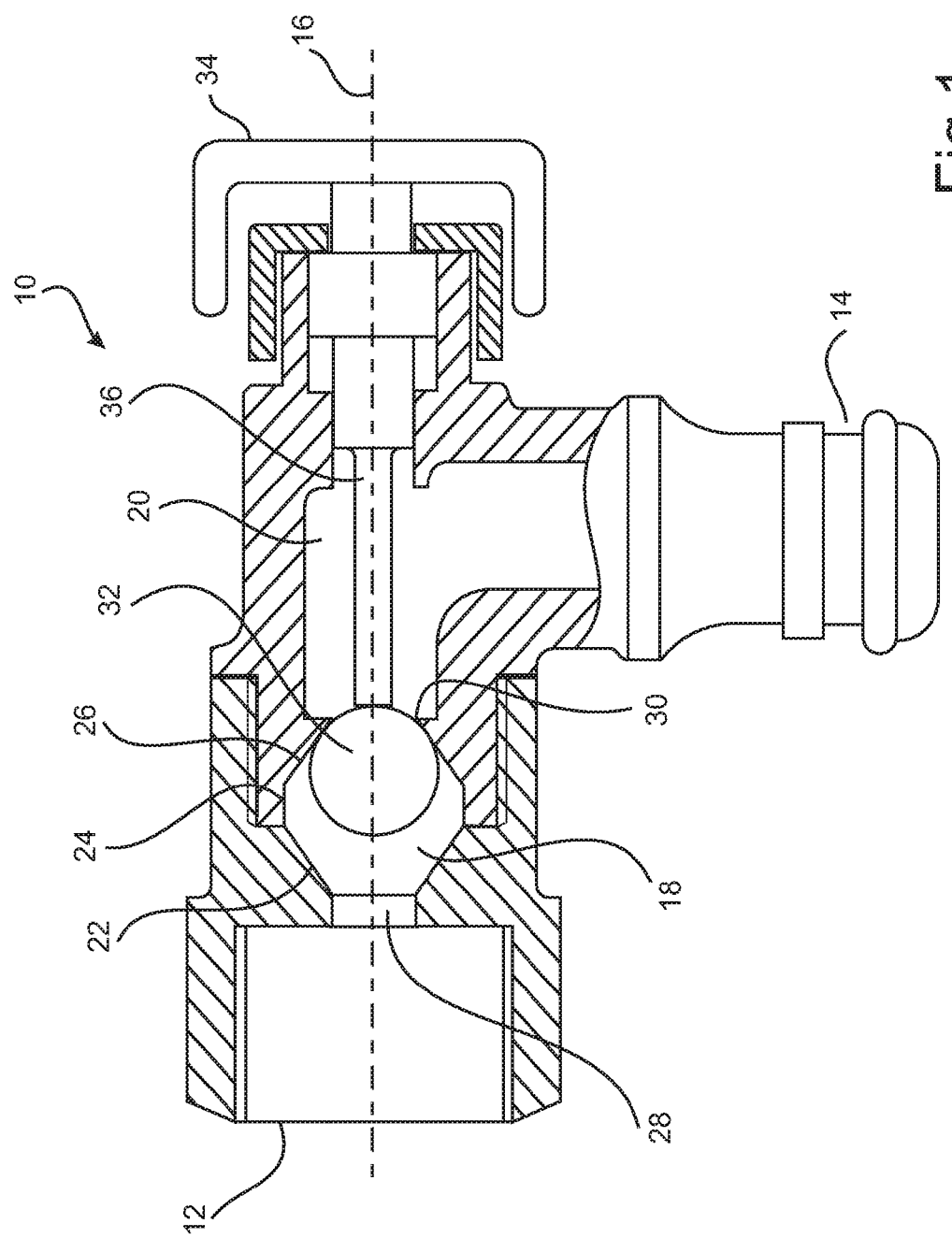
FIG. 1 is a cross-sectional schematic view of a water tap in accordance with the present invention, shown in a closed position.

In accordance with the present invention there is shown a water tap 10. The water tap 10 includes a water inlet 12 arranged to be fluidly connected to a water main (not shown), and a water outlet 14. The water outlet 14 is shown as a 'snap-fit' hose connection, but it will be appreciated that other arrangements, such as a common externally threaded outlet, may be employed.

In the embodiment shown, the water inlet 12 and the water outlet are oriented perpendicularly to each other. Water passing through the tap 12 thus enters in a first water flow direction, aligned with the water inlet 12, and exits in a second water flow direction, aligned with the water outlet 14.

It will be useful to describe the arrangement of the tap 10 with respect to a central tap axis 16. This axis is defined as parallel to the first water flow direction.

The tap 10 includes a receiving compartment 18 and an elbow portion 20, the arrangement being such that water flows in turn through the water inlet 12, the receiving compartment 18, the elbow portion 20 and the water outlet 14. Each of the water inlet 12, the receiving compartment 18 and the elbow portion 20 are located along the central tap axis 16.

The receiving compartment 18 is formed by a first frusto-conical portion 22, a central cylindrical region 24, and a second frusto-conical portion 26, each of which has its axis along the central tap axis 16. The arrangement is such that the radius of the central cylindrical region 24 is equal to the base radius of the first and second frusto-conical portions 22, 26. The first frusto-concial portion 22 tapers away from the central cylindrical region 24 to a first circular aperture 28. The second frusto-conical portion 26 tapers away from the central cylindrical region 24 towards a second circular aperture 30.

A sealing member in the form of a spherical ball 32 is located within the receiving compartment 18. The spherical ball 32 has a radius greater than that of the first and second circular apertures 28, 30, but less than that of the central cylindrical region 24. The ball 32 is thus contained within the receiving compartment 18.

The tap 10 includes an activation means in the form of a handle 34. The handle 34 is located along the central tap axis 16, at an end remote from the water inlet 12. This is in contrast to a traditional compression-type garden tap, where the handle is located above the water outer outlet 14.

The handle 34 is connected into a body of the tap 10 by means of a threaded connection (not directly shown), such that revolution of the handle 34 is translated into axial movement along the central tap axis 16.

An activating rod 36 extends from a base of the handle 34 through the elbow potion 20, along the central tap axis 16.

When the tap is in a closed position, as shown in FIG. 1, water is supplied through the inlet 12 under mains water pressure. This water pressurizes the receiving compartment 18 to mains pressure. The pressure acts against the ball 32, pushing it against the second frusto-conical portion 26. This seals the receiving compartment 18 from the elbow portion 20, and prevents the flow of water through the tap 10 to the water outlet 14. The second frusto-conical portion 26 thus acts as a valve seat, against which the ball seals.

When the tap 10 is to be opened, the handle 34 is turned, causing the activating rod 36 to move towards the ball 32. The activating rod 36 contacts the ball 32 along the central tap axis 16 (thus in a radial direction, through the ball's centroid). Further turning of the handle 34 forces the ball 32 towards the first circular aperture 28, and releases the contact of the ball on the second frusto-conical portion 26.

Figure 2:
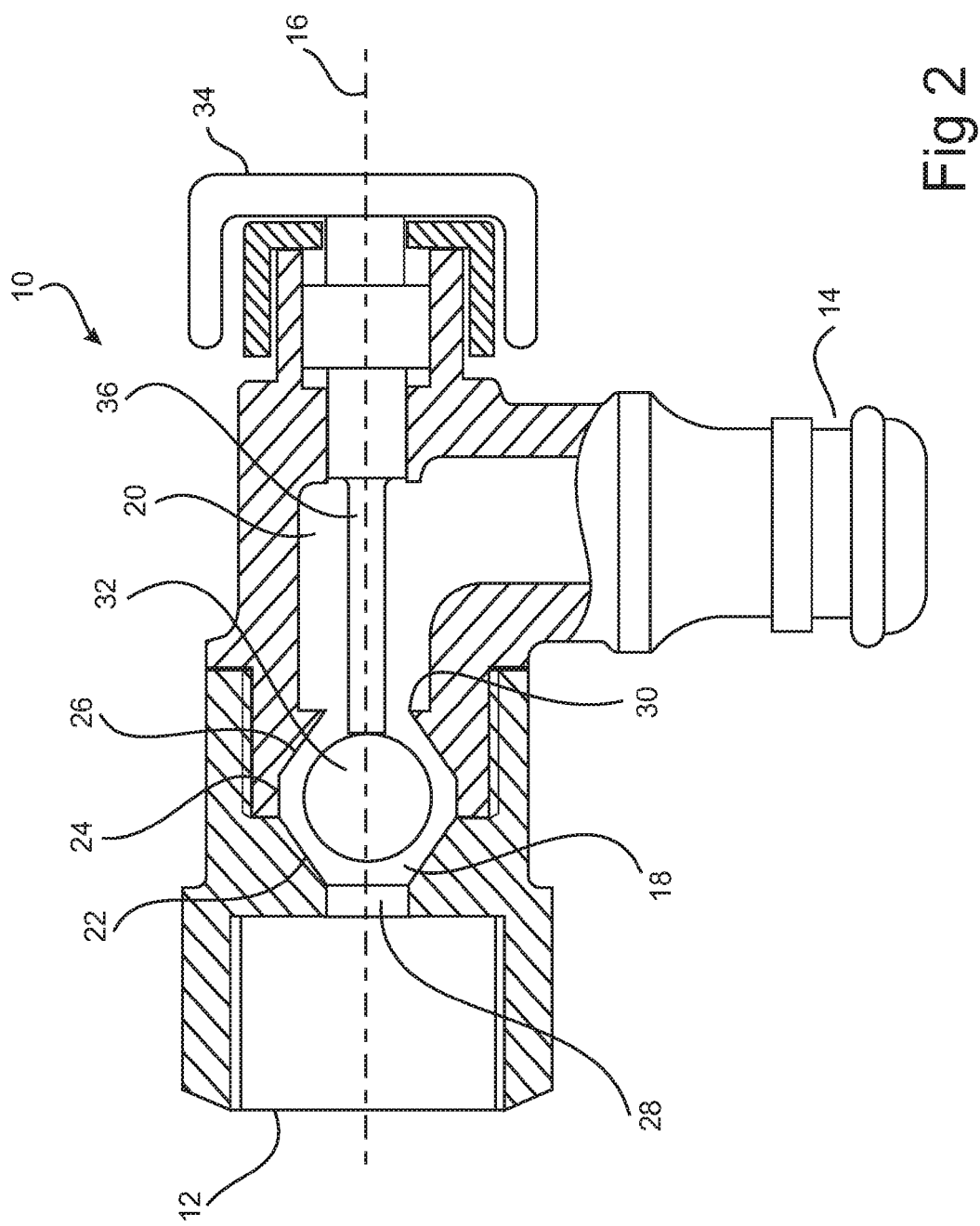
FIG. 2 is a cross-sectional schematic view of the tap of FIG. 1, shown in an open position.

Water will then flow around the ball 32, and through the second circular aperture 30, the elbow portion 20 and the water outlet 14. This flow of water will cause a corresponding drop of pressure around the sides of the ball 32, according to Bernoulli's principle. This will cause the ball to remain centered along the central tap axis 16, as the water pressure will act to self-correct any lateral movement of the ball 32. This position is shown in FIG. 2.

The flow rate through the tap will be determined by the minimal cross sectional area created between the ball 32 and the second frusto-conical portion 26. This will be proportional to the distance traveled by the activating rod 36, with area=$2\pi r. \sin^2 \alpha.d$, with r being the radius of the ball 32, $\alpha$ being the angle of the second frusto-conical portion 26 to the central axis 16, and d being the distance traveled by the activating rod 36.

In order to close the tap, it will simply be necessary to turn the handle in the other direction until the rod is no longer acting against the ball. Water pressure will cause the ball to return to the position of FIG. 1. As the tap is closed by the removal of an applied force to the ball, rather than the provision of one, the degree of force required to close the tap is relatively small.

It is preferred that the ball 32 be formed from a material less dense than water. This will ensure that water pressure acts on the ball 32 to its fullest extent, both in sealing in the closed position and in maintaining lateral orientation in the open position.

It will be understood that one way in which the arrangement of the embodiment shown differs from a conventional compression-type tap is that the valve seat is located in the first water flow path, rather than the second. For this reason, the simplest arrangement is to have the handle 34 located along the main tap axis 16. It will be appreciated that the invention could be applied with a different geometry, such as a handle located above the water outlet 14 or even the valve seat within the second water flow path. Such variations are considered to be within the scope of the present invention.

Further modifications and variations as would be apparent to a skilled addressee are similarly deemed to be within the scope of the present invention.

The claims defining the invention are as follows:

1. A water tap for use in regulating the flow of water delivered under pressure, the tap including a frusto-conical valve seat having an outlet aperture and a base radius, the radius of the outlet aperture is smaller than the base radius, a spherical sealing member having a radius larger than the radius of the outlet aperture, and an activating rod,
   wherein the tap is operable between a closed position in which the water pressure urges the spherical sealing member into engagement with the frusto-conical valve seat, thus preventing the flow of water through the tap, and an open position in which the activating rod urges the spherical sealing member away from the valve seat, thus allowing flow of water through the tap,
   characterized in that the activating rod is arranged to act through a centroid of the spherical sealing member and to urge the spherical sealing member into a position substantially centrally of the resulting water flow,
   wherein the radius of the spherical sealing member is smaller than the base radius of the frusto-conical valve seat such that a flow rate through the tap is variable by adjusting the location of the spherical sealing member relative to the frusto-conical valve seat
   wherein the sealing member is located within a receiving compartment of the tap, the receiving compartment having a water inlet axially opposed to the valve seat, the water inlet sized so as to prevent the passage of the sealing member from the receiving compartment in the event of a loss of water pressure, and
   wherein the receiving compartment has a frusto-conical portion adjacent the water inlet such that the sealing member rests on the frusto conical portion adjacent the water inlet in the event of a loss of water pressure.

2. A water tap as claimed in claim 1 wherein the activating rod is connected to a handle, mounted in a threaded arrangement at an outer end of the tap, such that rotation of the handle causes axial movement of the activating rod.

3. A water tap as claimed in claim 2 wherein the sealing member has density less than that of water.

4. A water tap as claimed in claim 1 wherein the flow rate through the tap is proportional to a cross-sectional area between the spherical sealing member and the frusto-conical valve seat.

5. A water tap as claimed in claim 4 wherein the cross-sectional area between the spherical sealing member and the frusto-conical valve seat is proportional to a distance travelled by the activating rod.

6. A water tap as claimed in claim 5 wherein the cross sectional area defines an annular cross sectional are such that, in the open position, water flows through the annular cross sectional area and wherein the relation between the cross sectional area (area) and the distance travelled (d) by the activating rod is given by area=$2\pi r \sin^2 \alpha d$, wherein, r is the radius of the spherical sealing member, and α is an angle of the frusto-conical valve seat to a central axis of the valve seat.

7. A water tap as claimed in claim 6 wherein the sealing member has density less than that of water.

8. A water tap as claimed in claim 5 wherein the sealing member has density less than that of water.

9. A water tap as claimed in claim 4 wherein the sealing member has density less than that of water.

10. A water tap as claimed in claim 1 wherein the sealing member has density less than that of water.

11. A water tap as claimed in claim 1, wherein the frusto-conical valve seat is the same size as the frusto-conical portion adjacent the water inlet.

12. A water tap as claimed in claim 11, wherein the frusto-conical valve seat is separated from the frusto-conical portion adjacent the water inlet by a cylindrical portion.

13. A water-tap as claimed in claim 11 wherein, in a fully open position, the activating rod maintains the sealing member substantially centrally in the receiving compartment.

14. A water tap as claimed in claim 1, wherein the frusto-conical valve seat is separated from the frusto-conical portion adjacent the water inlet by a cylindrical portion.

15. A water-tap as claimed in claim 14 wherein, in a fully open position, the activating rod maintains the sealing member substantially centrally in the receiving compartment.

16. A water-tap as claimed in claim 1 wherein, in a fully open position, the activating rod maintains the sealing member substantially centrally in the receiving compartment.

17. A water-tap as claimed in claim 16 wherein, in the fully open position, the sealing member is equidistant from the frusto-conical valve seat and the frusto-conical portion adjacent the water inlet.

18. A water tap as claimed in claim 1, wherein the water inlet and receiving compartment are located along a central tap axis that is horizontal.

19. A manually operated water tap for use in regulating the flow of water delivered under pressure, the tap having a tap inlet and a tap outlet and including a frusto-conical valve seat having an outlet aperture and a base radius, the radius of the outlet aperture is smaller than the base radius, a spherical sealing member having a radius larger than the radius of the outlet aperture, and an activating rod,
wherein the tap is operable between a closed position in which the water pressure urges the spherical sealing member into engagement with the frusto-conical valve seat, thus preventing the flow of water through the tap, and an open position in which the activating rod urges the spherical sealing member away from the valve seat, thus allowing flow of water through the tap,
characterized in that the water tap comprises (i) a receiving compartment of the tap with the sealing member being located within the receiving compartment which has a water inlet axially opposed to the valve seat, the water inlet sized so as to prevent the passage of the sealing member from the receiving compartment in the event of a loss of water pressure, and the receiving compartment has a frusto-conical portion adjacent the water inlet such that the sealing member rests on the frusto conical portion adjacent the water inlet in the event of a loss of water pressure and (ii) an elbow portion that includes the tap outlet such that water flows through the tap inlet, receiving compartment, elbow portion and water outlet,
wherein the tap inlet, receiving compartment and elbow portion are located along a non-vertical central axis,
wherein the activating rod, which is connected to a handle, is arranged to act through a centroid of the spherical sealing member and to urge the spherical sealing member into a position substantially centrally of the resulting water flow, and
wherein the radius of the spherical sealing member is smaller than the base radius of the frusto-conical valve seat such that a flow rate through the tap is variable by adjusting the location of the spherical sealing member relative to the frusto-conical valve seat.

20. A water tap as claimed in claim 19, wherein the central axis is horizontal.

21. A water tap as claimed in claim 19, wherein the handle is mounted in a threaded arrangement at an outer end of the tap, such that rotation of the handle causes axial movement of the activating rod.

22. A water tap as claimed in claim 19, wherein the flow rate through the tap is proportional to a cross-sectional area between the spherical sealing member and the frusto-conical valve seat.

23. A water tap as claimed in claim 22, wherein the cross-sectional area between the spherical sealing member and the frusto-conical valve seat is proportional to a distance travelled by the activating rod.

24. A water tap as claimed in claim 23, wherein the cross sectional area defines an annular cross sectional area such that, in the open position, water flows through the annular cross sectional area and wherein the relation between the cross sectional area (area) and the distance travelled (d) by the activating rod is given by area=$2\pi r \sin^2 \alpha d$, wherein, r is the radius of the spherical sealing member, and α is an angle of the frusto-conical valve seat to a central axis of the valve seat.

25. A water tap as claimed in claim 19, wherein the sealing member has density less than that of water.

26. A water tap as claimed in claim 19, wherein the frusto-conical valve seat is the same size as the frusto-conical portion adjacent the water inlet.

27. A water tap as claimed in claim 26, wherein the frusto-conical valve seat is separated from the frusto-conical portion adjacent the water inlet by a cylindrical portion.

28. A water tap as claimed in claim 19, wherein the frusto-conical valve seat is separated from the frusto-conical portion adjacent the water inlet by a cylindrical portion.

* * * * *